(12) United States Patent
Hietbrink et al.

(10) Patent No.: US 10,758,871 B2
(45) Date of Patent: Sep. 1, 2020

(54) ASSEMBLY FOR USE AT AN AREA FOR ALLOWING A FLUID TO PASS THERETHROUGH

(71) Applicant: KONINKLIJKE PHILIPS N.V., Eindhoven (NL)

(72) Inventors: Roelant Boudewijn Hietbrink, Utrecht (NL); Bart Andre Salters, Eindhoven (NL); Esther Anna Wilhelmina Gerarda Janssen, Waalre (NL); Cornelis Gerardus Visser, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 15/770,659

(22) PCT Filed: Oct. 27, 2016

(86) PCT No.: PCT/EP2016/076000
§ 371 (c)(1),
(2) Date: Apr. 24, 2018

(87) PCT Pub. No.: WO2017/072266
PCT Pub. Date: May 4, 2017

(65) Prior Publication Data
US 2018/0318769 A1   Nov. 8, 2018

(30) Foreign Application Priority Data
Oct. 28, 2015 (EP) ..................................... 15191883

(51) Int. Cl.
| | | |
|---|---|---|
| *B01D 65/08* | (2006.01) | |
| *C02F 1/00* | (2006.01) | |
| *C02F 1/32* | (2006.01) | |

(52) U.S. Cl.
CPC .............. *B01D 65/08* (2013.01); *C02F 1/003* (2013.01); *C02F 1/32* (2013.01); *B01D 2321/343* (2013.01); *C02F 2307/12* (2013.01)

(58) Field of Classification Search
None
See application file for complete search history.

(56) References Cited

U.S. PATENT DOCUMENTS

| | | |
|---|---|---|
| 5,322,569 A | 6/1994 | Titus et al. |
| 7,008,540 B1 | 3/2006 | Weavers et al. |

(Continued)

FOREIGN PATENT DOCUMENTS

| | | |
|---|---|---|
| RU | 2355427 C2 | 5/2009 |
| WO | 2011049277 A1 | 4/2011 |
| WO | 2015037538 A1 | 3/2015 |

*Primary Examiner* — Chester T Barry

(57) ABSTRACT

An assembly (1) which is intended for use at an area (31, 32) for allowing a fluid to pass therethrough comprises a filter (10) for blocking items from passing through the area (31, 32) along with the fluid, and at least one anti-biofouling source (20) for emitting ultraviolet light during operation thereof for realizing anti-biofouling of at least a portion of the filter (10). The filter (10) comprises a filter body provided with apertures, wherein the actual filter body is at least partially transparent to the ultraviolet light, so that anti-biofouling of the entire filter (10) may be guaranteed, even in case the anti-biofouling source (20) is positioned at only one side (15, 16) of the filter (10) and/or is integrated in the filter (10).

20 Claims, 5 Drawing Sheets

(56) References Cited

U.S. PATENT DOCUMENTS

| | | | |
|---|---|---|---|
| 10,301,195 B2* | 5/2019 | Smetona | C02F 1/325 |
| 2011/0042280 A1 | 2/2011 | Lautzenheiser et al. | |
| 2013/0048545 A1* | 2/2013 | Shatalov | C02F 1/325 |
| | | | 210/96.1 |
| 2013/0220934 A1* | 8/2013 | Otani | B01D 61/08 |
| | | | 210/668 |
| 2014/0078584 A1 | 3/2014 | Farr et al. | |
| 2015/0101983 A1 | 4/2015 | Yeh et al. | |
| 2016/0272521 A1* | 9/2016 | Murthy | C02F 3/307 |

\* cited by examiner

ASSEMBLY FOR USE AT AN AREA FOR ALLOWING A FLUID TO PASS THERETHROUGH

CROSS-REFERENCE TO PRIOR APPLICATIONS

This application is the U.S. National Phase application under 35 U.S.C. § 371 of International Application No. PCT/EP2016/076000, filed on 27 Oct. 2016, which claims the benefit of European Patent Application No. 15191883.6, filed on 28 Oct. 2015. These applications are hereby incorporated by reference herein.

FIELD OF THE INVENTION

The invention relates to an assembly for use at an area for allowing a fluid, i.e. a gas and/or a liquid, to pass therethrough, which assembly comprises a filter for blocking items from passing through the area along with the fluid, the filter comprising a filter body provided with apertures. In the second place, the invention relates to a compartment for containing a fluid, having at least one opening in a wall thereof for allowing the fluid to pass therethrough, and comprising an assembly as mentioned, wherein the filter of the assembly is positioned in the opening. In the third place, the invention relates to a hose for transporting a fluid, comprising an assembly as mentioned, wherein the filter of the assembly is positioned at least partially in the hose. In the fourth place, the invention relates to a domestic appliance comprising the compartment for containing a fluid as mentioned and/or the hose for transporting a fluid as mentioned, and also to use of the assembly as mentioned in a domestic appliance in a more general sense.

BACKGROUND OF THE INVENTION

An area for allowing a fluid to pass therethrough can be found in numerous contexts, and may be any area in a body for accommodating a flow of a fluid, or an opening serving as an inlet of a fluid, for letting in fluid to a place for receiving the fluid, an opening serving as an outlet of a fluid, for discharging fluid from a certain place, or an opening serving as a combination of an inlet and an outlet. In any case, such an area is in fact a passage for fluid, which may be delimited by material of one or more objects. For example, the area may be an opening at an end of a tube, or may be an opening in a wall delimiting a space for containing a fluid.

An example of a field in which the invention is well applicable is the field of water conditioning appliances for water cleaning, which can be used in a domestic environment for filtering water prior to reaching the faucet or as a terminal end device which may be mounted on the faucet. In general, one practical application of the invention is in the context of appliances which are adapted to treat water by means of mechanical filtration. Mechanical water filters are available in many types, and are of a porous nature, meaning that they comprise a filter body provided with apertures, the filter body representing a presence of material and having a function in retaining items to be removed from water, and the apertures representing an absence of material and having a function in allowing the water to pass the filter. Thus, when a flow of water is conducted through a mechanical water filter, items as may be present in the water at the inlet side of the filter get trapped in the filter and are prevented from reaching the outlet side of the filter, provided that they are not so small that they can pass through the apertures of the filter. A mechanical water filter may come in any form as suitable in a given situation. Practical examples include a disc provided with a pattern of holes, a collection of sand particles, a construction including interspaced strip-like elements, a piece of cotton cloth, and a block of dense but porous material such as ceramic.

In view of the function of filtering items from a fluid, it is normal for a filter to get clogged as time passes, which hinders the flow of fluid through the area in which the filter is present, and which may eventually result in total blockage of that area if the filter is not replaced or cleaned in time. In order to maintain the function of a filter at the highest possible level, it is desirable to remove factors which are known to contribute to clogging of the filter, as a result of which clogging takes place at an accelerated pace. A well-known example of such factors is a phenomenon called biological fouling or biofouling.

In general, biofouling is the accumulation of organisms like microorganisms, plants, algae, small animals and the like on surfaces. According to some estimates, over 1,800 species comprising over 4,000 organisms are responsible for biofouling. Hence, biofouling is caused by a wide variety of organisms. Biofouling is divided into micro biofouling which includes biofilm formation and bacterial adhesion, and macro biofouling which includes the attachment of larger organisms. Especially micro biofouling is an issue in the context of filters, and may cause significant shortening of the maintenance interval, especially in situations in which filters are applied for cleaning water or another fluid having a relatively high content of biofouling organisms.

SUMMARY OF THE INVENTION

It is an object of the invention to provide anti-biofouling measures which are applicable to a filter to be used at an area for allowing a fluid to pass therethrough, which are effective without necessarily requiring mechanical cleaning of the filter. According to the invention, an assembly for use at an area as mentioned is provided, wherein the assembly comprises a filter and at least one anti-biofouling source for emitting ultraviolet light during operation thereof for realizing anti-biofouling of at least a portion of the filter, and wherein the actual filter body of the filter is at least partially transparent to the ultraviolet light.

In the context of the invention, anti-biofouling of at least a portion of the filter is realized on the basis of applying at least one anti-biofouling source which is configured to emit ultraviolet light during operation thereof. The filter is adapted to allow the ultraviolet light to pass through at least a portion of the actual filter body thereof, on the basis of which several advantageous options are obtained in respect of the positioning of the at least one anti-biofouling source with respect to the filter, as will be explained in the following. In any case, by having a filter which at least partially does not block a transfer of the ultraviolet light, the anti-biofouling effects obtained by operating the anti-biofouling source are enhanced with respect to a situation in which a conventional filter is used. In particular, by having an appropriate design of the filter, wherein at least portions of the filter at strategic positions are transparent for allowing ultraviolet light emitted by the anti-biofouling source during operation thereof to pass through the filter at those portions, it is possible to reach more portions of the filter than as would be the case with a non-transparent filter, without needing to apply more anti-biofouling sources. In other words, according to the invention, the at least one anti-biofouling source can be applied for keeping the filter clean in a more efficient manner, not by modifying the anti-biofouling source in some way and/or increasing the number of anti-biofouling sources, but by adapting the design of the filter.

For the sake of clarity, it is noted that the wording "actual filter body" as used in this text should be understood such as to be applicable to the material appearance of the filter body, underlining the fact that the invention is not about allowing ultraviolet light emitted by an anti-biofouling source to pass through the apertures as present in the filter body, but relates to a novel concept of allowing ultraviolet light to pass through the actual material of the filter body.

The filter of the invention may have any practical appearance, as mentioned earlier. In some cases, it is applicable to have a filter of a particular design, comprising a number of elements and spaces between the elements. In such cases, according to the invention, at least one of the elements of the filter is at least partially transparent to the ultraviolet light. In a practical sense, this implies that at least part of the material as present in the filter is transparent to ultraviolet light.

In a practical embodiment, the filter comprises a carrier frame and transparent portions which are transparent to ultraviolet light, the portions being distributed over the carrier frame. The carrier frame can comprise material which is not transparent to the ultraviolet light, and can be made of any type of material which is commonly used in the field of filters. By allowing for a combination of materials in the filter, it is possible to realize a partially transparent character of the filter without necessarily decreasing constructional strength of the filter, while a possible increase of costs of the filter can be kept to a minimum. Advantageously, the transparent portions are distributed over the carrier frame, so as to have both the effect of ultraviolet light being allowed to pass through and the necessary constructional strength throughout the filter. Materials which are suitable for use in the transparent portions include quartz, silicones and calcium fluoride. It may particularly be advantageous for the transparent portions to be transparent to ultraviolet light having a wavelength in a range of about 250 nm to 300 nm.

On the basis of the capacity of at least a portion of the filter to allow ultraviolet light to pass through, it is possible for the anti-biofouling source to be integrated in the filter and still be capable of performing its anti-biofouling function on at least a portion of the filter. The fact is that the ultraviolet light emitted by the anti-biofouling source during operation thereof is allowed to pass through the filter at the portions where the filter has the capacity as mentioned. In a conventional situation, the ultraviolet light would not be allowed to travel far through the filter, as the ultraviolet light would be blocked by the material of the filter body. Hence, in such a situation, integrating the anti-biofouling source in the filter would not help much in realizing anti-biofouling of the filter, unless an anti-biofouling source would be arranged in every aperture of the filter body, which is expensive and not at all practical in view of the fact that the apertures are normally of a rather small size. Contrariwise, the invention offers a cost-effective and practical solution, wherein the number of anti-biofouling sources to be applied with the filter can be kept to a minimum, and wherein it is not necessary to have one or more anti-biofouling sources at a position outside of the filter, which is advantageous when it comes to protecting the anti-biofouling sources from getting damaged.

The number of anti-biofouling sources to be used with the filter according to the invention can be chosen freely according to desire. The number of anti-biofouling sources can range from one anti-biofouling source to a plurality of anti-biofouling sources, all of which can be integrated in the filter.

In case the filter comprises a carrier frame and transparent portions distributed over the carrier frame, it is very practical for the anti-biofouling source to be integrated in the carrier frame. Also in such case, the number of anti-biofouling sources to be used with the filter may range from one anti-biofouling source to a plurality of anti-biofouling sources.

The anti-biofouling source may be adapted to emit ultraviolet light of the UVC type, and even more specifically, ultraviolet light having a wavelength in a range of about 250 nm to 300 nm, during operation thereof. Furthermore, the anti-biofouling source may comprise at least one light source such as an LED. A very practical and effective application of the invention may be realized, namely an application in which the filter is constituted by a light guide for receiving ultraviolet light from at least one anti-biofouling source, wherein the ultraviolet light is coupled into the combined filter/light guide at the position of the anti-biofouling source, wherein the ultraviolet light is spread through the entire combined filter/light guide, and wherein the ultraviolet light is coupled out of the combined filter/light guide at any appropriate position.

The invention furthermore relates to a compartment for containing a fluid, having at least one opening in a wall thereof for allowing the fluid to pass therethrough, and comprising an assembly as described in the foregoing, i.e. an assembly including a filter which is adapted to allow ultraviolet light to pass through at least a portion of the actual filter body thereof. The filter is positioned in the opening of the compartment such as to be allowed to perform its function of blocking particles from passing through the opening along with the fluid. It is noted that in the context of the invention, the term "compartment" should preferably be understood such as to at least cover any place, space, chamber or basin which is at least partially delimited by a wall in which an opening is arranged for allowing fluid to pass therethrough, from the compartment to outside of the compartment, and/or in the opposite direction, whatever the case may be.

The anti-biofouling source of the assembly may be positioned inside the compartment, wherein optionally the anti-biofouling source is associated with a wall of the compartment. On the basis of the application of the invention in the filter, there is no need for having an anti-biofouling source outside of the compartment for realizing an anti-biofouling effect on the side of the filter facing outwardly from the compartment, so that the anti-bio fouling source may be well protected inside the compartment, practically without a risk of damage of the anti-biofouling source.

In many possible applications of the invention, it may be practical to not continuously keep the at least one anti-biofouling source in an activated state, in order to save energy and prolong the lifetime of the anti-biofouling source. In view thereof, a method of controlling operation of at least one anti-biofouling source in an assembly as defined in the foregoing is provided, wherein the anti-biofouling source is activated only during limited periods of time in relationship to at least one characteristic of a flow of fluid through the filter, and wherein the anti-biofouling source is optionally operated in synchronization with the fluid flow, out of synchronization with the fluid flow, or, in a case of an intermittent fluid flow, for only a predetermined period after occurrence of the fluid flow, to mention only a few of the possibilities existing within the broader concept of having a relation between an activated state of the anti-biofouling source during a limited period of time and at least one characteristic of a flow of the fluid.

The invention also relates to a hose for transporting a fluid, comprising an assembly as described in the foregoing, i.e. an assembly including a filter which is adapted to allow ultraviolet light to pass through at least a portion of the actual filter body thereof. The filter is positioned at least partially in the hose. The position of the filter with respect to the hose as seen along the length of the hose may be chosen such as to be appropriate in a given situation, wherein the filter may be arranged such as to be present in an opening at an end of the hose, although this is not essential within the framework of the invention.

The compartment as mentioned in the foregoing and/or the hose as mentioned in the foregoing may be part of a domestic appliance. Hence, the invention is applicable to any type of domestic appliance having some kind of space for containing a filtered fluid such as water and/or having a system for transporting a fluid and filtering the fluid during transport. Furthermore, the invention is applicable to domestic appliances comprising an assembly of a filter and at least one anti-biofouling source in a more general sense, including domestic appliances which actually do not have a compartment for containing a fluid and/or a hose for transporting a fluid, the filter being designed according to the general principle of allowing ultraviolet light emitted by an anti-biofouling source during operation thereof to pass through at least a portion of the actual filter body of the filter. Examples of domestic appliances include water conditioning appliances, beverage makers, water dispensers, air purifiers, air conditioning appliances, siphon arrangements, dishwashers, and dryers, to mention only some of the possible product ranges. Domestic appliances are often also referred to as home appliances or household appliances.

For the sake of completeness, the following is noted in respect of anti-bio fouling by using ultraviolet light. The anti-biofouling source for producing the ultraviolet light may comprise a light source which is chosen to specifically emit ultraviolet light of the c type, which is also known as UVC light, and even more specifically, light with a wavelength roughly between 250 nm and 300 nm. It has been found that most biofouling organisms are killed, rendered inactive, or rendered unable to reproduce by exposing them to a certain dose of the ultraviolet light. A typical intensity which appears to be suitable for realizing anti-biofouling is 10 mW per square meter, to be applied continuously or at a suitable frequency. A very efficient source for producing UVC light is a low pressure mercury discharge lamp, in which an average of 35% of input power is converted to UVC power. Another useful type of lamp is a medium pressure mercury discharge lamp. The lamp may be equipped with an envelope of special glass for filtering out ozone-forming radiation. Furthermore, a dimmer may be used with the lamp if so desired. Other types of useful UVC lamps are dielectric barrier discharge lamps, which are known for providing very powerful ultraviolet light at various wavelengths and at high electrical-to-optical power efficiencies, and LEDs. In respect of the LEDs, it is noted that they can generally be included in relatively small packages and consume less power than other types of light sources. LEDs can be manufactured to emit (ultraviolet) light of various desired wavelengths, and their operating parameters, most notably the output power, can be controlled to a high degree. According to yet another option, the light source for emitting ultraviolet light can be provided in the form of a tubular lamp.

A general advantage of using ultraviolet light for realizing anti-biofouling is that the microorganisms are prevented from adhering and rooting on a surface to be kept clean. Ultraviolet light may also be used for removal of biofouling, but prevention of biofouling by means of light treatment is preferred over removal of biofouling by means of light treatment, as the latter requires more input power and involves a higher risk that the light treatment is not sufficiently effective. In view of the fact that the light sources for producing ultraviolet light may be arranged and configured such that only a relatively low level of input power is needed, the light sources may be operated to continuously produce anti-biofouling light across a large filter surface without extreme power requirements, or the light sources may be operated at a duty cycle, wherein the light sources are on for a certain percentage of a time interval, and off for the rest of the time interval, wherein the time interval may be chosen to be in the order of magnitude of minutes, hours, or whatever is appropriate in a given situation. As not much additional power is required, the light sources can be easily applied in existing structures.

The invention is in the context of using at least one anti-biofouling source for realizing anti-biofouling of a filter which is adapted to allow ultraviolet light emitted by the anti-biofouling source during operation thereof to pass through at least a portion of the actual filter body of the filter. The anti-biofouling source may be arranged at any suitable position with respect to the filter, which position may be outside of the filter or integrated in the filter. In case at least two anti-biofouling sources are used, all anti-biofouling sources may be positioned outside of the filter, all anti-biofouling sources may be integrated in the filter, or one portion of the anti-biofouling sources may be positioned outside of the filter whereas the other portion of the anti-biofouling sources may be integrated in the filter. An advantage of integrating an anti-biofouling source in the filter is that in comparison with having an anti-biofouling source outside of the filter, the risk of the anti-biofouling source getting damaged is relatively low.

The above-described and other aspects of the invention will be apparent from and elucidated with reference to the following detailed description of a number of embodiments of an assembly comprising a filter and at least one anti-biofouling source for emitting ultraviolet light during operation thereof for realizing anti-biofouling of at least a portion of the filter. The embodiments are just examples of numerous possible embodiments existing within the framework of the invention.

BRIEF DESCRIPTION OF THE DRAWINGS

The invention will now be explained in greater detail with reference to the figures, in which equal or similar parts are indicated by the same reference signs, and in which.

The figures are of a diagrammatical nature only and are not necessarily drawn to scale.

DETAILED DESCRIPTION OF EMBODIMENTS

Figure 1:
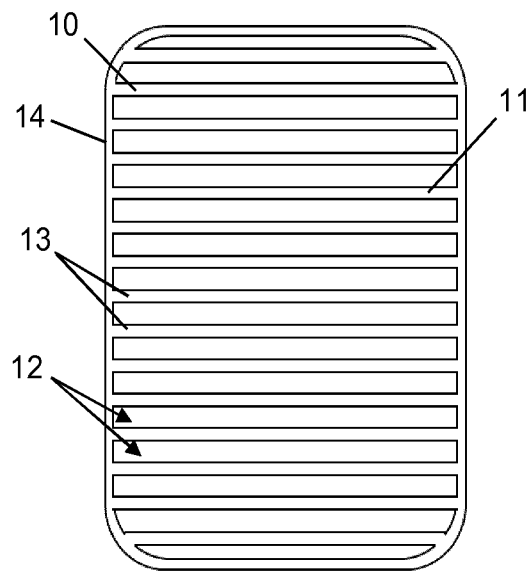
FIGS. 1 to 3 relate to an assembly of a filter and at least one anti-biofouling source according to a first embodiment of the invention in which the at least one anti-biofouling source is arranged outside of the filter, the figures showing the assembly as used with an inlet opening of a compartment for containing liquid as present in a domestic appliance, wherein FIG. 1 diagrammatically shows a front view of the filter, FIG. 2 diagrammatically shows a side view of the assembly and the compartment as mentioned, and FIG. 3 diagrammatically shows a side view of a portion of the filter.
Figure 2:
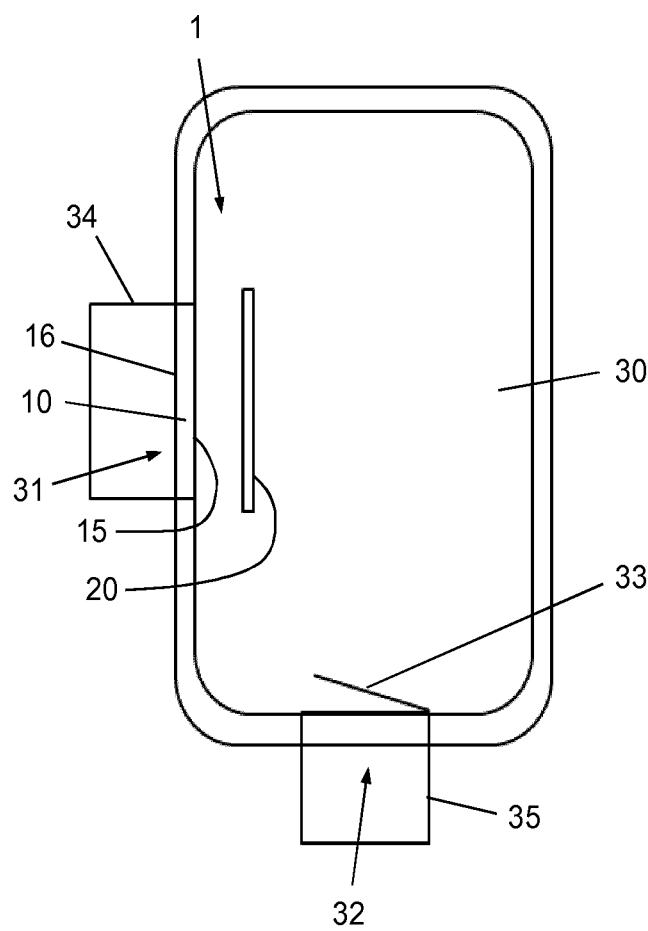
Figure 3:
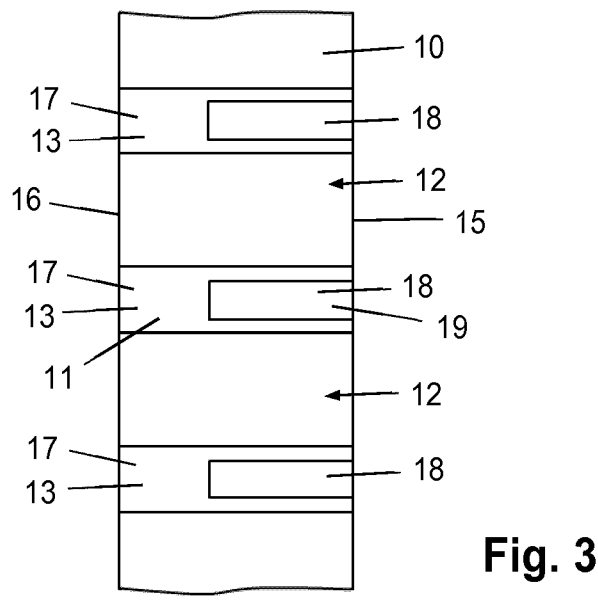

FIGS. 1 to 3 relate to an assembly 1 of a filter 10 and at least one anti-biofouling source 20 according to a first embodiment of the invention in which the at least one anti-biofouling source 20 is arranged outside of the filter 10, the figures showing the assembly 1 as used with an inlet opening 31 of a compartment 30 for containing liquid such as water in a domestic appliance such as a water conditioning appliance, wherein the filter 10 is arranged in the inlet opening 31 so as to block items from passing through the inlet opening 31 along with a supply of liquid to the compartment 30. In the shown example, the compartment 30 furthermore has an outlet opening 32 for allowing the liquid to be discharged from the compartment 30 and a valve 33 for setting one of an opened position and a closed position of the outlet opening 32. The fact that only one inlet opening 31 and one outlet opening 32 are shown should not be understood such as to imply that the invention is restricted to a particular number of openings 31, 32. Depending on the function of the domestic appliance, the filter 10 may be arranged at the position of the outlet opening 32 instead of the position of the inlet opening 31, or it may be so that both openings 31, 32 may be provided with a filter 10.

In general, an inlet opening 31 of a compartment 30 has a function in allowing liquid to flow into the compartment 30 from an outside source, and an outlet opening 32 of a compartment 30 has a function in allowing liquid to flow from the compartment 30 to a predetermined destination. In the shown example, an inlet tube 34, of which only an end portion is shown in FIG. 2, is used for transporting the liquid towards the inlet opening 31, and a discharge tube 35, of which only a first portion is shown in FIG. 2, is used for transporting the liquid away from the compartment 30. On the basis of the use of a filter 10 in the inlet opening 31, items as may be present in the liquid are prevented from entering the compartment 30 along with an incoming flow of the liquid as supplied through the inlet tube 34.

The filter 10 is of a mechanical nature and comprises a filter body 11 which is provided with apertures 12. Generally speaking, the filter body 11 is capable of serving as a barrier in the opening 31, 32 in which the filter 10 is fitted, whereas the apertures 12 are capable of allowing the liquid to pass through the filter 10. In fact, a filter 10 is adapted to divide an opening 31, 32 in at least two openings of smaller size. In the shown example, the filter body 11 comprises a plurality of elements 13 having an elongated shape and extending substantially parallel with respect to each other, in a regularly spaced arrangement, and also elements which are arranged such as to form a peripheral rim 14 of the filter 10. However, that does not alter the fact that the invention is equally applicable to any other possible type of filter, including the type in which the apertures 12 are present in a random natural arrangement in a certain piece of material such as a piece of cotton cloth or a block of porous material.

Spaces 12 between two adjacent elements 13 of the filter 10 are relatively small, so that the filter 10 is effective in allowing only liquid to enter the compartment 30 from the outside, while preventing items as may be present in the liquid to enter the compartment 30 as well. However, on the basis of this fact, there is a considerable risk of premature clogging of the filter 10, especially under the influence of biofouling. In order to significantly reduce this risk, at least one anti-biofouling source 20 is provided, which serves for emitting ultraviolet light during operation thereof, whereby it is possible to realize anti-biofouling of at least a portion of the filter 10. The anti-biofouling source 20 may be operated continuously, but it also possible to operate the anti-biofouling source 20 at certain intervals only, wherein the ultraviolet light may be dosed at a suitable intensity. The assembly 1 according to the first embodiment of the invention comprises at least one anti-biofouling source 20 which is arranged outside of the filter 10, at a position for covering at least a considerable portion of the filter 10 by the ultraviolet light. In the shown example, the anti-biofouling source 20 has an elongated tubular shape and is arranged inside the compartment 30 at a certain distance with respect to the filter 10, extending substantially parallel to the filter 10, in a direction which is substantially perpendicular to a direction in which the elements 13 of the filter 10 extend. Any suitable type of construction may be used for fixing the anti-biofouling source 20 at the appropriate position inside the compartment 30. The ultraviolet light used for realizing anti-biofouling of at least a portion of the filter 10 may be of the type known as UVC light, which is known to be effective for realizing anti-biofouling of surfaces.

In view of the fact that the anti-biofouling source 20 is arranged inside the compartment 30, an interior side 15 of the filter 10 facing the compartment 30 is under the direct influence of the anti-biofouling source 20. Hence, the anti-biofouling effect on this side of the filter 10 would be much stronger than on the other side of the filter 10, which will hereinafter be referred to as exterior side 16, if it would not be for measures according to the invention, which involve designing the filter 10 in such a way as to be at least partially transparent to the ultraviolet light. In this way, a situation in which the filter 10 clogs at the exterior side 16 thereof is prevented without a need for arranging another anti-biofouling source 20 at that side of the filter 10, which is advantageous in view of design reasons and costs, among other things.

In the first embodiment of the assembly 1 according to the invention, the elements 13 of the filter 10 are partially transparent and partially non-transparent. FIG. 3 illustrates the fact that the elements 13 comprise a combination of a transparent portion 17 and a non-transparent portion 18. The non-transparent portions 18 of the elements 13 may be made of a relatively strong material in order to serve as enforcement of the filter 10. Thus, the filter 10 may comprise a carrier frame 19 which is composed of the non-transparent portions 18 of the elements 13 and the elements forming the peripheral rim 14 of the filter 10. In the shown example, the arrangement of transparent portions 17 and non-transparent portions 18 is chosen such as to have an optimum of constructional strength and permeability to ultraviolet light. In particular, the non-transparent portions 18 are present at the interior side 15 of the filter 10, and extend in the direction of the exterior side 16 along only a portion of the distance between the two sides 15, 16 of the filter 10, while being embedded in the transparent portions 17.

Figure 4:
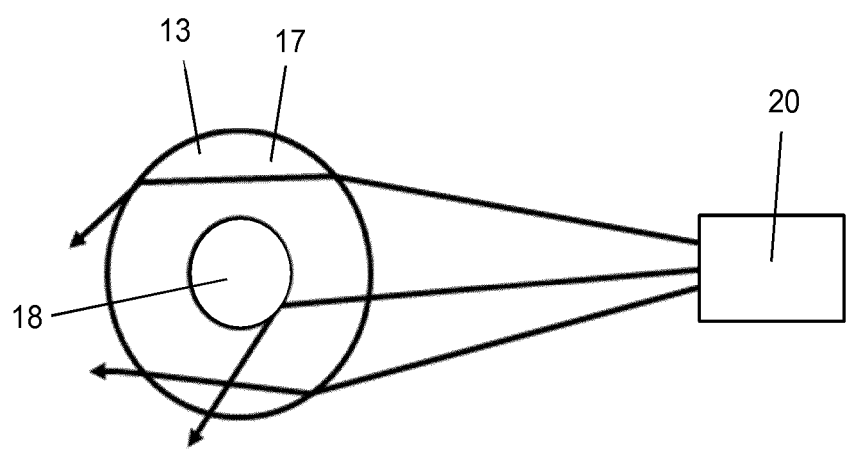
FIG. 4 illustrates examples of the way in which rays of ultraviolet light emitted by the anti-biofouling source during operation thereof may travel through an element of the filter.

In the assembly 1 according to the first embodiment of the invention, anti-biofouling of the filter 10 is realized by operating the anti-biofouling source 20 arranged inside the compartment 30 so as to emit ultraviolet light towards the interior side 15 of the filter 10. In the filter 10, the ultraviolet light is passed on all the way to the exterior side 16 of the filter 10 through the transparent portions 17 of the elements 13 of the filter 10. In this way, anti-biofouling of the entire filter 10 is realized, so that the capability of the inlet opening 31 in which the filter 10 is present to allow liquid to enter the compartment 30 is preserved, apart from the clogging process of the filter 10 that takes place due to the fact that the filter 10, performing a filtering function on the liquid, captures and retains items from the liquid. Examples of the way in which the ultraviolet light may travel through an element 13 at a position where the element 13 comprises a combination of a transparent portion 17 and a non-transparent portion 18 are shown in FIG. 4, the rays being depicted like arrows. Especially, in FIG. 4, a cross-sectional view of the element 13 is shown, so that it may be clear that some of the light follows such a path that the non-transparent portion 18 is not encountered, and that some of the light does encounter the non-transparent portion 18, but may reach the exterior side 16 of the filter 10 anyway on the basis of reflection on the non-transparent portion 18 and further travel through the transparent portion 17.

Like the assembly 1 according to the first embodiment of the invention, the assembly 2 according to the second embodiment of the invention comprises a filter 10 and at least one anti-biofouling source 20. A difference between the two embodiments resides in the fact that in the second embodiment, the at least one anti-biofouling source 20 is integrated in the filter 10. The second embodiment may still comprise one or more anti-biofouling sources 20 arranged outside of the filter 10, but it is preferred for all anti-biofouling sources 20 of the assembly 2 to be integrated in the filter 10 in order to dispense with a need for measures aimed at realizing a stable positioning of the anti-biofouling sources 20 inside the compartment 30. Also, the anti-biofouling sources 20 are very well protected against possible damage in the case of the integrated arrangement of the anti-biofouling sources 20 in the filter 10.

Figure 5:
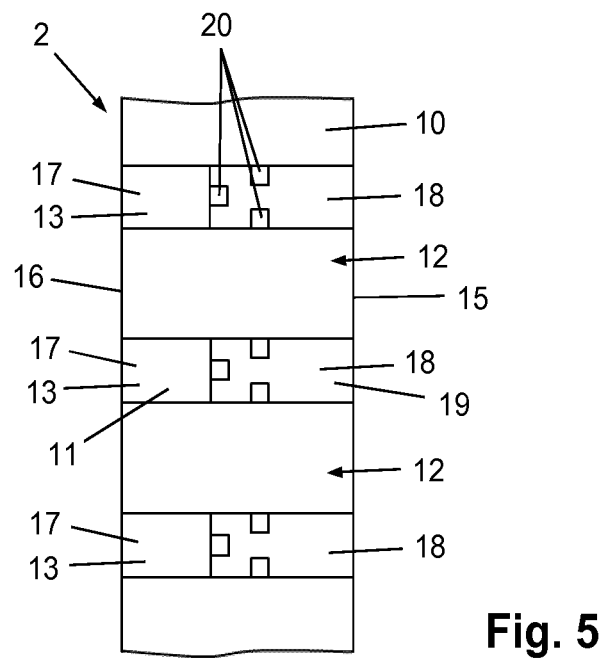
FIG. 5 relates to an assembly of a filter and at least one anti-biofouling source according to a second embodiment of the invention in which a plurality of anti-biofouling sources are integrated in the filter, wherein the figure diagrammatically shows a side view of a portion of the assembly.

FIG. 5 illustrates how the integrated arrangement of the anti-biofouling sources 20 in the filter 10 may be realized. In the shown example, the elements 13 of the filter 10 comprise transparent portions 17 and non-transparent portions 18, wherein the non-transparent portions 18 are positioned at the interior side 15 of the filter 10, and the transparent portions 17 are positioned at the exterior side 16 of the filter 10. Each of the non-transparent portions 18 is provided with a number of recesses for accommodating anti-biofouling sources 20. The number of recesses and the associated number of anti-biofouling sources 20 per non-transparent portion 18 can be chosen freely within the framework of the invention. Also, it is not essential that every non-transparent portion 18 is equipped with at least one anti-biofouling source 20, although this is preferred for obtaining optimal anti-biofouling results at a minimum of power consumption. The anti-biofouling sources 20 may be provided in the form of LEDs for emitting ultraviolet light. It is practical for each of the elements 13 of the filter 10 to be provided with arrays of LEDs, extending in the longitudinal direction of the elements 13. In the shown example, complete coverage of the filter 10 for anti-biofouling purposes is obtained by having LEDs in the sides of the non-transparent portions 18 of the elements 13 facing each other and the side of the non-transparent portions 18 facing the transparent portions 17. As is the case with the filter 10 of the assembly 1 according to the first embodiment of the invention, the filter 10 of the assembly 2 according to the second embodiment of the invention can be sufficiently strong due to the presence of the non-transparent portions 18 of the elements 13 thereof, constituting a carrier frame 19, and can also be effective in staying clean under the influence of the ultraviolet light emitted by the anti-biofouling sources 20 during operation thereof, the anti-biofouling sources 20 being distributed over the carrier frame 19.

In a practical embodiment, the filter 10 of the assembly 1, 2 according to the invention may comprise a carrier frame 19 with silicones or Teflon. Possibly also sandwiches of silicone and quartz could be applied in a way as known per se from the field of safety windows.

Figure 6:
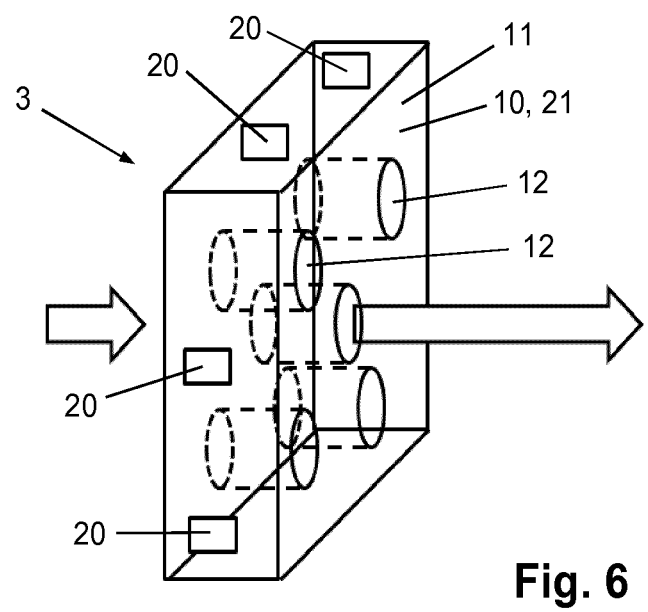
FIG. 6 relates to an assembly of a filter and at least one anti-biofouling source according to a third embodiment of the invention in which the filter is constituted by a guide for receiving ultraviolet light from a number of anti-biofouling sources, wherein the figure diagrammatically shows a perspective view of the assembly.

FIG. 6 relates to an assembly 3 of a filter 10 and at least one anti-biofouling source 20 according to a third embodiment of the invention in which the filter 10 is constituted by a guide 21 for receiving ultraviolet light from a number of anti-biofouling sources 20 located outside of the guide 21, at positions for coupling ultraviolet light into the guide 21. In the following, by way of example, it is assumed that the anti-biofouling sources 20 are light sources such as LEDs for emitting ultraviolet light during operation thereof, and that the guide 21 is a light guide which is transparent to ultraviolet light. In FIG. 6, a flow-through direction of the combined filter 10/light guide 21, i.e. a direction in which a fluid such as water or air flows through the combined filter 10/light guide 21 during operation, which is related to the shape and the positioning of the apertures 12 of the combined filter 10/light guide 21, is indicated by means of arrows. FIG. 6 illustrates the fact that it is advantageous for the light sources 20 to be arranged so as to couple light into the combined filter 10/light guide 21 in directions which are perpendicular to the flow-through direction, which does not alter the fact that other possibilities exist within the framework of the invention. In FIG. 3, the combined filter 10/light guide 21 is shown as a block having a square cross-sectional periphery. This is only one example of the many possible designs of the combined filter 10/light guide 21. Another example is a cylinder shape of the combined filter 10/light guide 21, having a circular cross-sectional periphery.

During operation of the assembly 3 of the combined filter 10/light guide 21 and the light sources 20, the light sources 20 are activated, at least from time to time, for coupling light into the combined filter 10/light guide 21, wherein the light spreads through the entire combined filter 10/light guide 21, and wherein an anti-biofouling effect is obtained on the entire combined filter 10/light guide 21 as a result thereof, in a very effective manner due to the light guide functionality of the body 11 of the combined filter 10/light guide 21.

Figure 7:
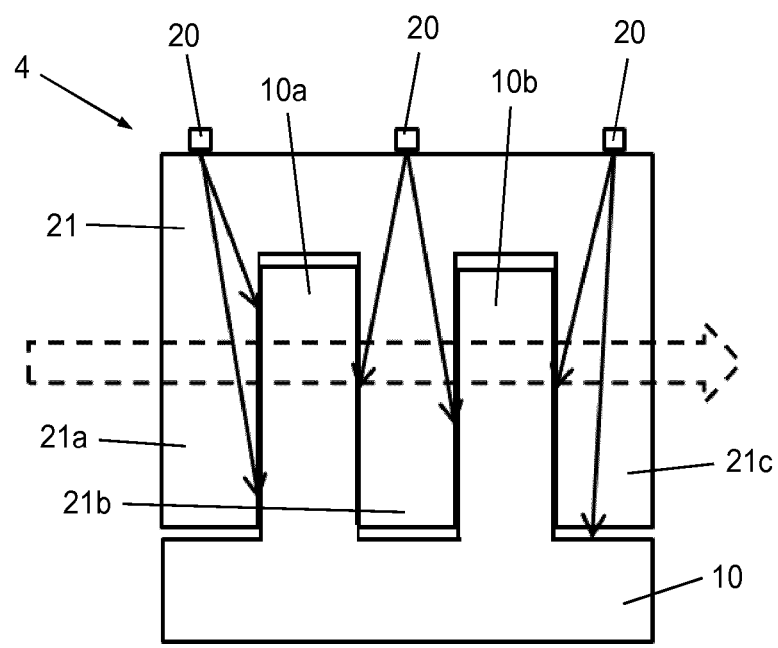
FIGS. 7 and 8 relate to an assembly of a filter and at least one anti-biofouling source according to a fourth embodiment of the invention and a fifth embodiment of the invention, respectively, in which the filter comprises multiple layers, and in which a guide for receiving ultraviolet light from a number of anti-biofouling sources is applied, the guide comprising multiple layers as well, and the guide being arranged with respect to the filter in such a way that an alternating positioning of filter layers and guide layers is realized in a flow-through direction of the filter.
Figure 8:
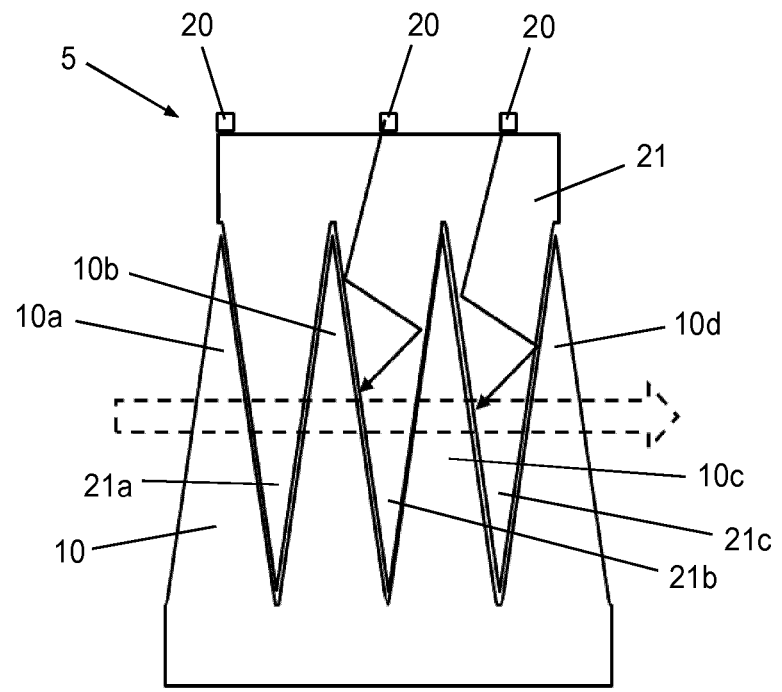

FIGS. 7 and 8 relate to an assembly 4, 5 of a filter 10 and at least one anti-biofouling source 20 according to a fourth embodiment of the invention and a fifth embodiment of the invention, respectively, in which the filter 10 comprises multiple layers 10a, 10b, 10c, 10d, and in which a guide 21 for receiving ultraviolet light from a number of anti-biofouling sources 20 is applied, the guide 21 comprising multiple layers 21a, 21b, 21c as well, and the guide 21 being arranged with respect to the filter 10 in such a way that an alternating positioning of filter layers 10a, 10b, 10c, 10d and guide layers 21a, 21b, 21c is realized in a flow-through direction of the filter 10 as indicated by means of a dashed arrow in the figures. In this configuration, the guide 21 is adapted to allow the fluid to be filtered by the filter 10 to pass through, so that a flow of the fluid is not blocked by the guide 21.

Preferably, as shown in the figures, the guide 21 is designed so as to be complementary to the filter 10, which allows the guide layers 21a, 21b, 21c to completely fill spaces as present between the filter layers 10a, 10b, 10c, 10d, wherein maximum exposure of the filter layers 10a, 10b, 10c, 10d to the ultraviolet light coupled out of the guide 21 during operation of the anti-biofouling sources 20 is realized. Both the filter layers 10a, 10b, 10c, 10d and the guide layers 21a, 21b, 21c can have a more or less rectangular sectional shape, as shown in FIG. 7, or both the filter layers 10a, 10b, 10c, 10d and the guide layers 21a, 21b, 21c can be wedge-shaped, as shown in FIG. 8, which does not mean that the invention does not cover other possible shapes of both the filter layers 10a, 10b, 10c, 10d and the guide layers 21a, 21b, 21c as well.

In FIGS. 7 and 8, examples of paths of the ultraviolet light from a position of coupling into the guide 21 to a position of coupling out of the guide 21 are indicated by means of arrows extending from the anti-biofouling sources 20. The material of the filter 10 is at least partially transparent to the ultraviolet light emitted by the anti-biofouling sources 20 during operation thereof and guided towards the filter 10 by the guide 21, so that one or more portions of the filter 10 which are not in a position for facing the guide 21 can still be provided with the ultraviolet light. Hence, it is possible to keep the entire filter 10 clean. Also in this example, the anti-biofouling sources 20 are light sources for emitting ultraviolet light during operation thereof, and the guide 21 is a light guide which is transparent to ultraviolet light.

Figure 9:
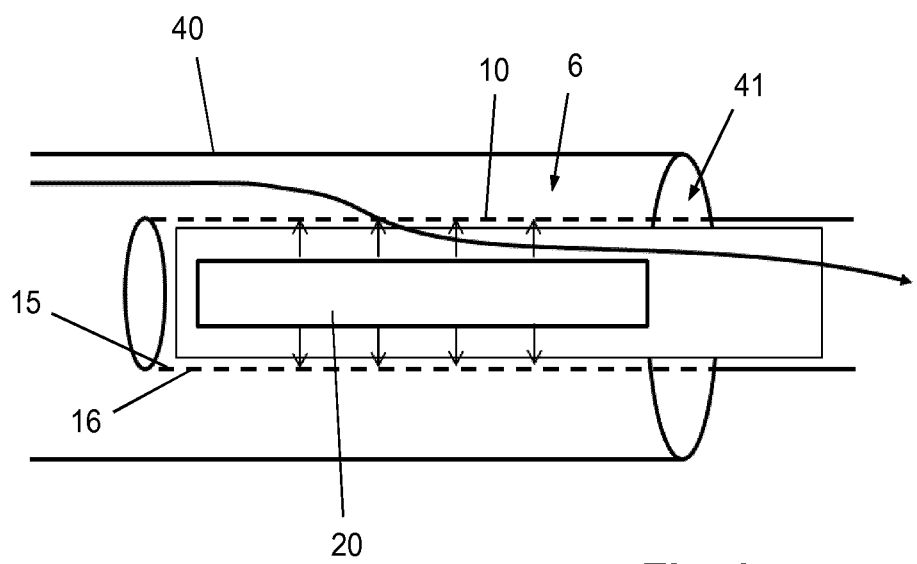
FIG. 9 relates to an assembly of a filter and at least one anti-biofouling source according to a sixth embodiment of the invention in which the filter has a hollow cylindrical shape and in which the anti-biofouling source has a tubular shape and is arranged so as to extend through the filter, the figure showing the assembly as used with a hose for transporting a fluid.

FIG. 9 relates to an assembly 6 of a filter 10 and at least one anti-biofouling source 20 according to a sixth embodiment of the invention in which the filter 10 has a hollow cylindrical shape and in which the anti-biofouling source 20 has a tubular shape and is arranged so as to extend through the filter 10. In particular, in this embodiment, the anti-biofouling source 20 may be a tubular ultraviolet lamp. In FIG. 9, ultraviolet radiation from the ultraviolet lamp 20 to the inner surface 15 of the filter 10 is indicated by a number of arrows extending from the lamp 20 to the filter 10. Furthermore, in FIG. 9, a flow of a fluid such as water or air through the filter 10 is indicated by a slightly curved arrow. Advantageously, as is the case in the shown example, the ultraviolet lamp 20 extends through the filter 10 along at least a substantial portion of the total length of the filter 10.

The material of the filter 10 is at least partially transparent to the ultraviolet light, so that for the purpose of keeping both the inner surface 15 and the outer surface 16 of the filter 10 free from biofouling, it suffices to only have an ultraviolet lamp 20 which is arranged in the interior space of the filter 10, wherein there is no need for one or more additional lamps 20 outside the filter 10, which does not alter the fact that it is possible to have such lamps 20 if so desired. Also, within the framework of the invention, when it is desired to have an anti-biofouling effect on both the inner surface 15 and the outer surface 16 of the filter 10, it is possible to have a configuration in which the ultraviolet light is supplied to the filter 10 from outside of the filter 10 only, preferably by means of a number of lamps 20 which are equally distributed about the periphery of the filter 10, wherein there is no need for applying at least one ultraviolet lamp 20 at a position inside the filter 10, due to the fact that the material of the filter 10 is at least partially transparent to the ultraviolet light.

FIG. 9 shows the assembly 6 of the cylindrical filter 10 and the ultraviolet lamp 20 as used with a hose 40 for transporting a fluid. Such a hose 40 may be present in a domestic appliance, for example, and may be part of a larger system for transporting fluid through the appliance. In the shown example, the filter 10 and the hose 40 are positioned in a concentric arrangement, wherein a part of the filter 10 extends in the hose 40, and wherein another part of the filter 10 projects from an opening 41 at an end of the hose 40. It is possible for the hose 40 to be connected to any suitable other component of the domestic appliance for receiving filtered fluid from the hose 40 at the end as mentioned, or the end may be a free end for dispensing the fluid from the appliance.

It will be clear to a person skilled in the art that the scope of the invention is not limited to the examples discussed in the foregoing, but that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details that are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. Any reference signs in the claims should not be construed as limiting the scope of the invention. The phrase "a plurality of" as used in this text should be understood such as to mean "at least two".

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The term "substantially" as used in this text will be understood by a person skilled in the art as being applicable to situations in which a certain effect is intended which can be fully realized in theory but which involves practical margins for its factual implementation. Examples of such an effect include a parallel arrangement of objects and a perpendicular arrangement of objects. Where applicable, the term "substantially" may be understood such as to be an adjective which is indicative of a percentage of 90% or higher, such as 95% or higher, especially 99% or higher, even more especially 99.5% or higher, including 100%.

The term "comprise" as used in this text will be understood by a person skilled in the art as covering the term "consist of". Hence, the term "comprise" may in respect of an embodiment mean "consist of", but may in another embodiment mean "contain/include at least the defined species and optionally one or more other species".

A practical application of the invention is an application in the field of domestic appliances, as explained in the foregoing. That does not alter the fact that the invention is relevant in every situation in which a filter is present and in which the filter is exposed, during at least a part of its lifetime, to fluid that is apt to cause biofouling of the filter. Hence, the invention is also suitable to be applied in appliances for use in an industrial environment, which may be a marine environment.

Within the framework of the invention, any suitable way of operating the at least one anti-biofouling source 20 to be used for keeping at least a portion of the filter 10 clean may be chosen. It is possible to continuously keep the at least one anti-biofouling source 20 in an activated state, but it may not be necessary to do so in many practical cases. Hence, it is also possible to switch the at least one anti-biofouling source 20 on and off during appropriate periods of time. For example, when the filter 10 is arranged in a hose 40 for transporting a fluid, the at least one anti-biofouling source 20 may be operated in synchronization with the fluid flow, i.e. be activated when the fluid flows through the hose 40, and be switched off when there is no flow of fluid, or may be operated out of synchronization with the fluid flow, i.e. be activated when there is no flow of fluid, and be switched off when the fluid flows through the hose 40, whatever is appropriate in a given situation. Another possible approach, which is particularly applicable to situations in which fluid is discharged one batch at a time from a container or other suitable source on demand, involves operating the at least one anti-biofouling source 20 for a predetermined period after each discharge of the fluid, and keeping the anti-biofouling source 20 in a switched off state outside that predetermined period. In a general sense, it may be advantageous to switch the at least one anti-biofouling source 20 on and off during appropriate periods of time in an appropriate relationship to at least one characteristic of the fluid flow, such as the occurrence of the flow, the flow rate, etc.

Summarizing, an assembly 1, 2, 3, 4, 5, 6 which is intended for use at an area 31, 32, 41 for allowing a fluid to pass therethrough comprises a filter 10 for blocking items from passing through the area 31, 32, 41 along with the fluid, and at least one anti-biofouling source 20 for emitting ultraviolet light during operation thereof for realizing anti-biofouling of at least a portion of the filter 10. The filter 10 comprises a filter body 11, 13 provided with apertures 12, wherein the actual filter body 11, 13 is at least partially transparent to the ultraviolet light, so that anti-biofouling of the entire filter 10 may be guaranteed, even in case the anti-biofouling source 20 is positioned at only one side 15, 16 of the filter 10 and/or is integrated in the filter 10.

The invention claimed is:

1. An assembly, comprising:
   a filter configured to be disposed at an area and to allow a fluid to pass therethrough and to block items from passing through the area along with the fluid; and
   at least one anti-biofouling source configured to emit ultraviolet light during operation thereof for realizing anti-biofouling of at least a portion of the filter,
   wherein the filter is of a mechanical nature and comprises a filter body provided with apertures, and wherein at least part of a material of the filter body is transparent to the ultraviolet light, allowing the ultraviolet light to pass through the material of the filter body.

2. The assembly of claim 1, wherein the filter comprises a number of elements and spaces between the elements, wherein at least one of the elements of the filter is at least partially transparent to the ultraviolet light.

3. The assembly of claim 2, wherein the filter further comprises a carrier frame and portions which are transparent to the ultraviolet light, the transparent portions being distributed over the carrier frame.

4. The assembly of claim 3, wherein the carrier frame is made of a material which is non-transparent to the ultraviolet light.

5. The assembly of claim 4, wherein at least one anti-biofouling source is integrated in the carrier frame.

6. The assembly of claim 1, wherein the at least one anti-biofouling source is integrated in the filter.

7. The assembly of claim 1, wherein the filter comprises a light guide for receiving ultraviolet light from at least one anti-biofouling source.

8. The assembly of claim 1, wherein the ultraviolet light is UVC light, and wherein the at least one anti-biofouling source and the filter are configured such that the UVC light from at least one anti-biofouling source achieves anti-biofouling of the entire filter.

9. The assembly of claim 1, wherein the ultraviolet light is UVC light, and wherein the at least one anti-biofouling source and the filter are configured such that the UVC light from at least one anti-biofouling source achieves anti-biofouling of at least a portion of filter.

10. An appliance comprising the assembly of claim 9.

11. An appliance comprising the assembly of claim 1.

12. A compartment for containing a fluid, wherein the compartment has at least one wall, wherein there is at least one opening in the at least one wall thereof for allowing the fluid to pass therethrough, wherein the compartment includes the assembly of claim 1, wherein the filter of the assembly is positioned in the opening.

13. The compartment of claim 12, wherein the at least one anti-biofouling source is positioned inside the compartment.

14. The compartment of claim 13, wherein the at least one anti-biofouling source which is positioned inside the compartment is associated with a second wall of the compartment or the at least one wall.

15. The compartment of claim 12, wherein the ultraviolet light is UVC light, and wherein the at least one anti-biofouling source and the filter are configured such that the UVC light from at least one anti-biofouling source achieves anti-biofouling of at least a portion of filter.

16. An appliance comprising the compartment of claim 15.

17. An appliance comprising the compartment of claim 12.

18. A hose for transporting a fluid, comprising the assembly of claim 1, wherein the filter of the assembly is positioned at least partially in the hose.

19. The hose of claim 18, wherein the ultraviolet light is UVC light, and wherein the at least one anti-biofouling source and the filter are configured such that the UVC light from at least one anti-biofouling source achieves anti-biofouling of at least a portion of filter.

20. An appliance comprising the hose of claim 18.

\* \* \* \* \*